(12) United States Patent
Wu

(10) Patent No.: US 8,390,766 B2
(45) Date of Patent: Mar. 5, 2013

(54) LIGHT-REGULATION MEMBRANE

(75) Inventor: Yung-Lung Wu, Taipei (TW)

(73) Assignee: Chiefway Engineering Co., Ltd., Taipei (TW)

( * ) Notice: Subject to any disclaimer, the term of this patent is extended or adjusted under 35 U.S.C. 154(b) by 95 days.

(21) Appl. No.: 13/168,826

(22) Filed: Jun. 24, 2011

(65) Prior Publication Data

US 2011/0255035 A1 Oct. 20, 2011

Related U.S. Application Data

(63) Continuation-in-part of application No. 12/134,192, filed on Jun. 6, 2008, now abandoned, which is a continuation-in-part of application No. 11/812,969, filed on Jun. 22, 2007, now abandoned.

(51) Int. Cl.
*G02F 1/1333* (2006.01)
(52) U.S. Cl. .......................................... 349/86; 349/122
(58) Field of Classification Search .................. None
See application file for complete search history.

(56) References Cited

U.S. PATENT DOCUMENTS

| | | | |
|---|---|---|---|
| 5,152,111 A | 10/1992 | Baughman et al. |
| 6,204,900 B1 | 3/2001 | Fergason |
| 7,023,600 B2 | 4/2006 | Mallya et al. |
| 7,622,185 B2 | 11/2009 | Wang et al. |
| 2002/0171788 A1 | 11/2002 | Lin et al. |
| 2004/0247886 A1 | 12/2004 | Kudo et al. |
| 2009/0135319 A1 | 5/2009 | Veerasamy |
| 2010/0062189 A1 | 3/2010 | Yosomiya et al. |

*Primary Examiner* — Richard Kim
(74) *Attorney, Agent, or Firm* — Muncy, Geissler, Olds & Lowe, PLLC

(57) ABSTRACT

A light-regulation membrane easy for installation and maintenance is disclosed to include a PDLC film having two conducting layers prepared by high-reflection black and transparent materials made by means of depositing titanium oxide on a base layer of polyethylene terephthalate by means of spattering deposition and electrically connected to an external power source and a liquid crystal layer sandwiched between the conducting layers, a surface structure consisting of a hard coating layer and an anti-stain layer on one side of the PDLC film, and an adhesion layer formed the opposite side of PDLC film and releasably adhered to a transparent object. So, the transparency of the light-regulation membrane can be regulated from opaque to clear or reversely while the transmittance of the PDLC film being adjusted by the power, and then any light source passing through the light-regulation membrane can be controlled.

9 Claims, 4 Drawing Sheets

LIGHT-REGULATION MEMBRANE

This application is a Continuation-In-Part of application Ser. No. 12/134,192, filed on Jun. 6, 2008, now pending, which is a Continuation-In-Part of application Ser. No. 11/812,969, filed on Jun. 22, 2007. The patent applications identified above are incorporated here by reference in their entirety to provide continuity of disclosure.

BACKGROUND OF THE INVENTION

1. Field of the Invention

The present invention relates to light regulation technology and more specifically, to a light-regulation membrane that comprises a PDLC (polymer dispersed liquid crystal) film and a surface structure and an adhesion layer respectively arranged at the two opposite sides of the PDLC (polymer dispersed liquid crystal) film for regulating light and for use as projection screen for image exposure.

2. Description of the Related Art

Conventionally, images projected by an image projection apparatus are exposed by means of the reflection functioning of a projection screen. When wishing to obtain bright and clear images, the quality of the projection screen is also an important factor must be taken into account when considering the brightness, color and resolution specifications of the image projection apparatus.

Gain, viewing angle and light diffusion method are important technical indexes in determining the quality of a projection screen. Gain is the ability of the projection screen in reflecting light. The greater the reflective index is the higher the gain will be. The viewing angle is the maximum angle at which a display can be viewed with acceptable visual performance. It is commonly defined that the viewing angle as the angle at which the luminance of the image is exactly half of the maximum. Further, diffusion method is the diffusion of light path of the projected light after having been reflected. The smaller the diffusing angle is the better the reflection and picture clarity will be. On the contrary, a relatively greater degree of dispersion results in a relatively greater reflecting range. In this case, the picture viewed is soft and free from the interference of external noise light rays; however its brightness and clarity are poor.

Commercial inexpensive projection screens are commonly made of white plastic sheet materials. Other glass beads projection screens and pearl fixed projection screens are known. However, the gain of a white plastic sheet type projection screen is about 0.9, and therefore its brightness is poor. Further, U.S. Pat. No. 7,023,600 discloses a screen entitled "Switchable electro-optical laminates", which has scattering and transparent modes of operation for dynamically controlling electromagnetic radiation flow. When used as a projection screen, the image clarity is poor due to a high degree of light dispersion. There is a room for improvement in gain and light dispersion.

SUMMARY OF THE INVENTION

The present invention has been accomplished under the circumstances in view. According to one aspect of the present invention, the light-regulation membrane comprises a surface structure, an adhesion layer for adhering on a transparent object, and a PDLC (polymer dispersed liquid crystal) film sandwiched between the surface structure and the adhesion layer. When electricity is disconnected from the conducting layers of the PDLC (polymer dispersed liquid crystal) film, the liquid crystal layer of the PDLC (polymer dispersed liquid crystal) film is changed to a reflective status reflects the images of light, enabling the light-regulation membrane to be used as a projection screen. The projected light from an external image projection apparatus falling upon a hard coating layer of the surface structure is primarily diffused by nano grade light diffusing particles of a light diffusing unit of a hard coating layer of the surface structure, and then the diffused light goes through an anti-stain layer of the surface structure toward the PDLC film, and then reflected by the liquid crystal layer of the PDLC film. Thus, the reflected light is maintained in a low diffusion status, avoiding interference of external light rays and assuring high clarity and high softness image display effects. When the incident light falls upon the PDLC film, it is refracted by the liquid crystals in the liquid crystal layer of the PDLC film through the high-reflection black and transparent metal oxide, for example, titanium oxide of the conducting layer and then diffused secondarily by the light diffusing unit toward the outside. Thus, the light-regulation membrane of the invention not only improves the horizontal viewing angle but also eliminates the problems of hot spot, hot line and flash.

Further, when the external power source is switched on, the liquid crystal layer is changed to a transparent status, and incident light from an external image projection apparatus is primarily diffused by the nano grade light diffusing particles of the light diffusing unit to avoid inference of surrounding noise light rays. Further, the refractive index of the liquid crystal layer of the PDLC film is equal to the polymers, incident light can pass therethrough completely. Subject to diffusion by the light diffusing unit, light images are temporarily retained at the crystal molecules. Further, subject to the effects of the high-reflection black and transparent metal oxide, for example, titanium oxide of the conducting layer, the images exposed on the light-regulation membrane provide high transparency and suspension image projection effects, in consequence, the contrast ratio (picture brightness/darkness) is improved. Thus, the light-regulation membrane is practical for commercial application, enabling spectators to watch the suspension of images in a three-dimensional space.

Further, the adhesion layer can be directly and releasably adhered a flat surface of a transparent object plate. During installation of the light-regulation membrane, it is not necessary to destruct the original construction or indoor design. Because of the reusable characteristic of the adhesion layer, the installation, repair and replacement of the light regulation membrane are easy. Therefore, the light-regulation membrane has the advantages of re-usable, low cost, convenience in use and maintenance. Further, the light-regulation membrane can be kept smooth on a flat surface and will not be vibrated upon an air flow, assuring a high quality of image exposure.

Further, by means of switch on/off the external power source, the light-regulation membrane enables the transparent object to which it is adhered to let light pass or to reflect light. It can also effectively isolate and reflect heat, keeping the indoor space warm in the winter or cool in the summer and saving power consumption.

DETAILED DESCRIPTION OF THE PREFERRED EMBODIMENT

Figure 1:
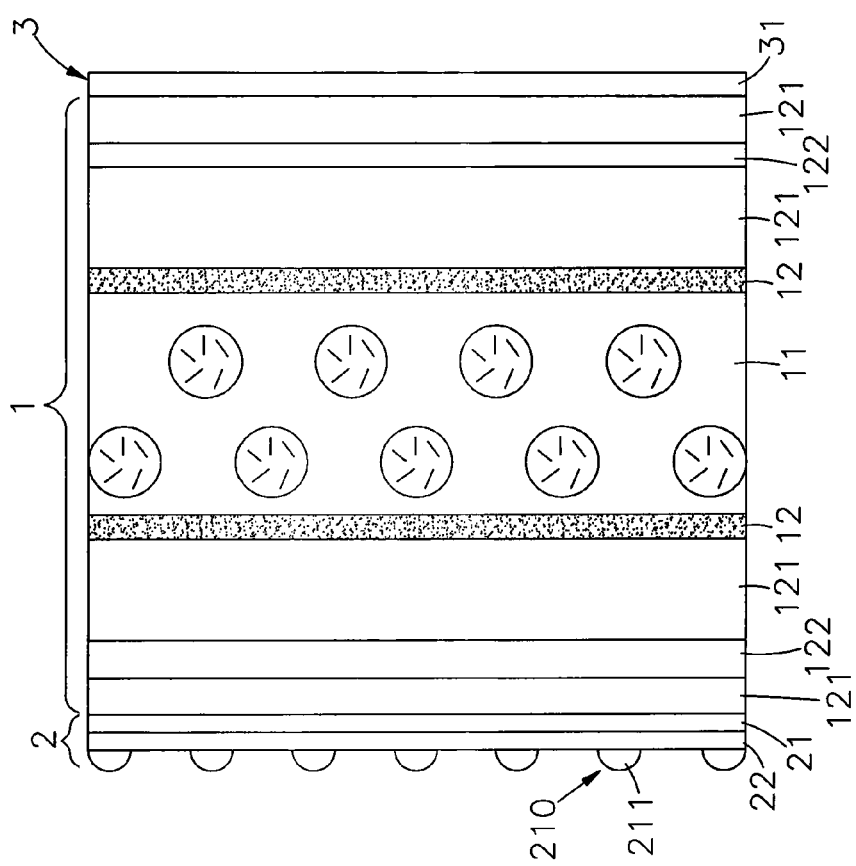
FIG. 1 is a schematic structural view of a light-regulation membrane in accordance with the present invention.
Figure 2:
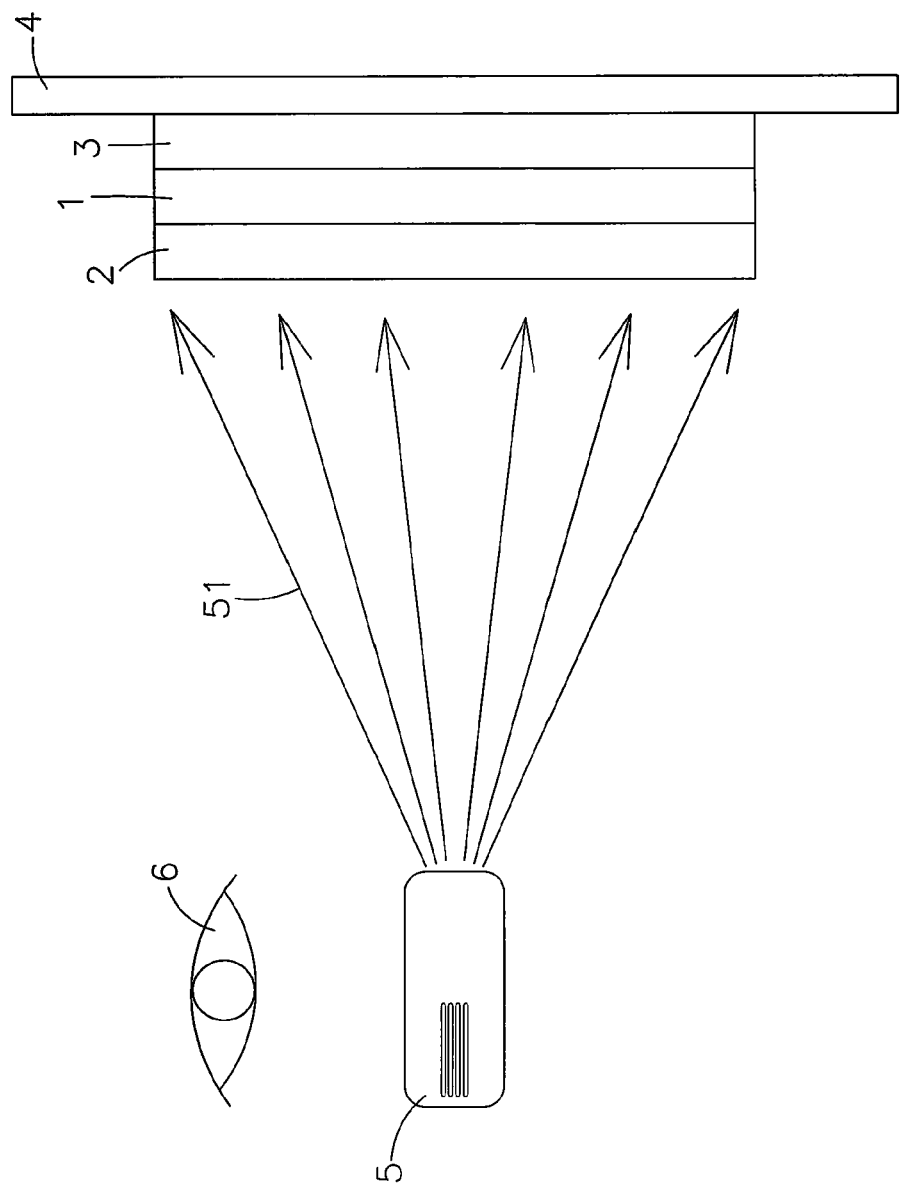
FIG. 2 is a schematic side view illustrating an application status of the present invention.

Referring to FIGS. 1~2, a light-regulation membrane in accordance with the present invention is shown comprising a PDLC (polymer dispersed liquid crystal) film 1, a surface structure 2, and an adhesion layer 3.

The PDLC film 1 comprises a liquid crystal layer 11 and two conducting layers 12. The liquid crystal layer 11 is sandwiched between the two conducting layers 12. The two conducting layers 12 are electrically connected to an external power source. The liquid crystal layer 11 can be prepared from a compound of hydroxyl polyfunctional (meth) acrylates and nematic liquid crystal cured with a polyisocyanate compound crosslinking agent. The two conducting layers 12 are high-reflection black and transparent materials made by means of depositing titanium oxide on a base layer of PET (polyethylene terephthalate by means of spattering deposition. However, this preparation method is not a limitation. Metal oxide or conducting polymers, such as ITO (indium tin oxide), $SnO_2$ (tin dioxide) or ZnO (zinc oxide) may be used as a substitute.

The surface structure 2 is formed on one side of the PDLC film 1, comprising a hard coating layer 21 and an anti-stain layer 22. The anti-stain layer 22 is for protection against dirt and stains, cross-linked with silicone alkyl groups prepared by hydroxyl-functional organopolysiloxane resin consisting essentially of $SiO_2$.

The hard coating layer 21 is sandwiched between the anti-stain layer 22 and the PDLC film 1. The hard coating layer 21 may be made of cross-linking copolymer acrylates and an ultraviolet absorbent, having a specific repeating structure unit and containing a certain amount of carbonate bond. The hard coating layer 21 can be a UV curable organic coating prepared from a mixture of multi-functional acrylates, silicone acrylate as a slip agent, a crosslinkage adhesion promoter, and photo-initiators, or a mixture of multi-functional acrylates, silicone acrylate as a slip agent, a (meth) acrylate terminated toughener, nano sized silica as inorganic filler, a silane coupling agent, and photo-initiators, comprising a light diffusing unit 210 formed of nano grade light diffusing particles 211. The nano grade light diffusing particles 211 can be inorganic particles, organic particles, or hybrid particles of inorganic and organic materials. The hard coating layer 21 contains 95~99.9% cross-linking copolymer acrylates and 0.1%~5% light diffusing particles. Further, the refractive index of the body of the hard coating layer 21 is different from that of the nano grade light diffusing particles 211.

The adhesion layer 3 is formed on one side of the PDLC film 1 opposite to the surface structure 2 for releasably adhering to a transparent object 4, such as transparent glass, poly methyl methacrylate (PMMA) plate or polycarbonate plate. The adhesion layer 3 can be made of a mixture of organic silicone and acrylic pressure sensitive adhesive 31.

Figure 3:
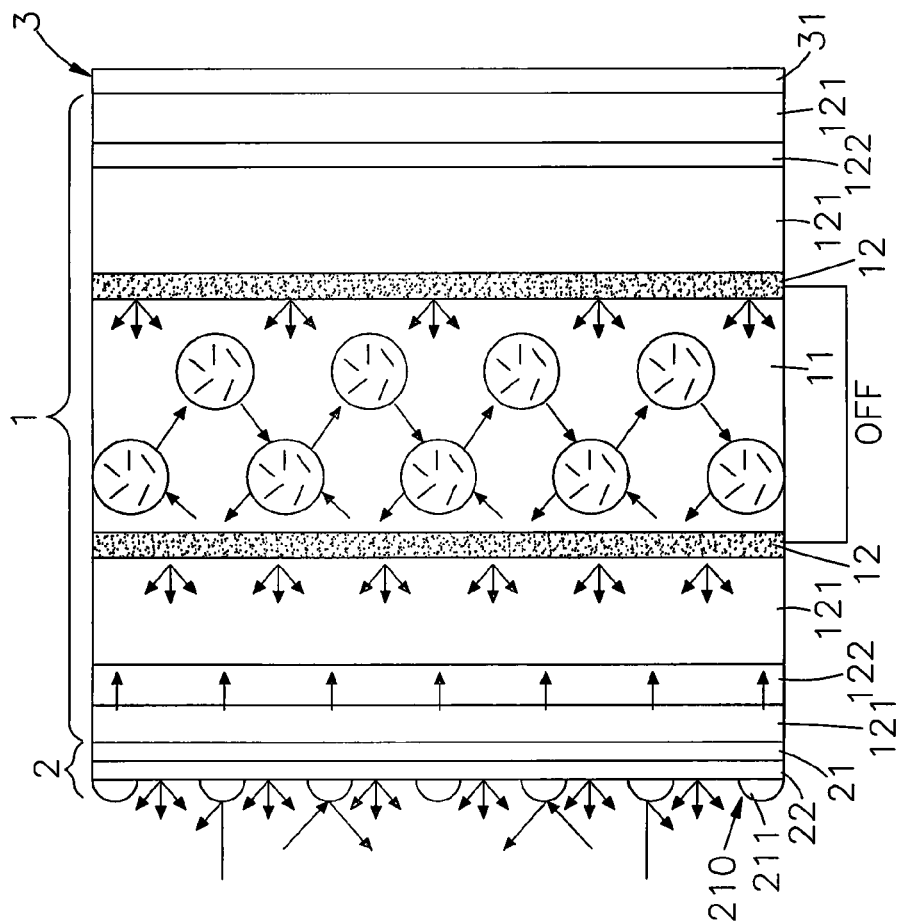
FIG. 3 is a schematic structural view illustrating one operating mode of the light-regulation membrane in accordance with the present invention.
Figure 4:
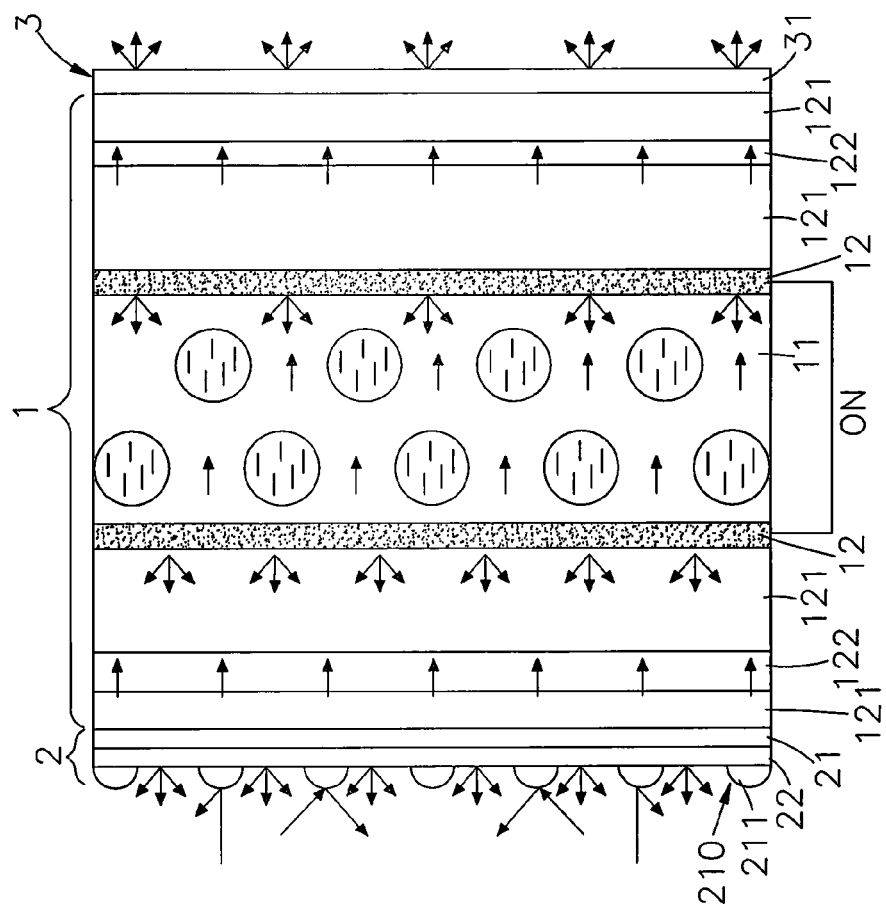
FIG. 4 is a schematic structural view illustrating another operating mode of the light-regulation membrane in accordance with the present invention.

The aforesaid embodiment in which the light-regulation membrane comprises a PDLC (polymer dispersed liquid crystal) film 1, a surface structure 2 formed on one side of the PDLC film 1 and an adhesion layer 3 formed on the other side of the PDLC film 1 is simple an example of the present invention. In an alternate form of the present invention, as shown in FIG. 3, the light-regulation membrane further comprises at least one, for example, two polymer compound layers 121 formed on each of the two conducting layers 12, and a pressure sensitive adhesive (PSA) 122 sandwiched between the two polymer compound layers 121 at each side of the PDLC film 1. The polymer compound layers 121 are prepared from a plastic chemical material, for example, PET (polyethylene terephthalate), PMMA (polymethyl methacrylate), PC (polycarbonate), PP (polypropylene), PE (polyethylene), PVDC (polyvinylidene chloride), PS (polystyrene), COP (cycloolefin polymer), hydrogenated polystyrene or their compound.

Referring to FIGS. 2 and 3 again, by means of the adhesion layer 3, the light-regulation membrane is adhered to a transparent object 4. When the external power source is off, the liquid crystal layer 11 of the PDLC film 1 is off, the molecules are not arranged in an order and the refractive index of the liquid crystal layer 11 is lower than the external polymers so that incident light is dispersed in the polymers of the light-regulation membrane, causing the light-regulation membrane to show the color of oyster white that does not admit light. At this time, the light-regulation membrane causes the transparent object 4 to show a frosted glass effect. Thus, the light-regulation membrane can be used as a projection screen. When in use, the image projection apparatus 5, such as slide projector, video tape player or reflective projector can be placed on a predetermined place in front of or behind the light-regulation membrane. Further, the transparent object 4 can be a fixed or detachable member arranged at or affixed to the desired place, allowing people standing or sitting on the same side or the other side relative to the image projection apparatus 5 to watch the projected images. When operating the image projection apparatus 5 to project images onto the light-regulation membrane, the liquid crystal layer 11 that is changed to a reflective status reflects the images of light. The projected light 51 from the image projection apparatus 5 falls upon the hard coating layer 21 of the surface structure 2, and is primarily diffused by the nano grade light diffusing particles 211 of the light diffusing unit 210, and then the diffused light goes through the anti-stain layer 22 toward the PDLC film 1, and then reflected by the liquid crystal layer 11 of the PDLC film 1. Thus, the reflected light is maintained in a low diffusion status, avoiding interference of external light rays and assuring high clarity and high softness image display effects. During projection image exposure, high contrast of the exposure of the projected light 51 and non reflection of surrounding light rays are required. When the projected light 51 falls upon the PDLC film 1, it is refracted by the liquid crystals in the liquid crystal layer 11 of the PDLC film 1 through the high-reflection black and transparent metal oxide, for example, titanium oxide of the conducting layer 12 and then diffused secondarily by the light diffusing unit 210 onto the spectators' eyes 6. Thus, spectators can watch high quality of images exposed on the light-regulation membrane. The light-regulation membrane of the invention not only improves the horizontal viewing angle but also eliminates the problems of hot spot, hot line and flash.

When the external power source is switched on, electricity goes through the two conducting layers 12 of the PDLC film 1 to conduct the liquid crystal layer 11, causing the molecules to be in the liquid arranged and/or oriented in a crystal-like way. At this time, the refractive index of the liquid crystal layer 11 is equal to the external polymers, for allowing incident light to pass. At this time, the light-regulation membrane is seen in its original transparent status.

At this time, the projected light 51 from the image projection apparatus 5 falls upon the hard coating layer 21 of the surface structure 2, and is primarily diffused by the nano grade light diffusing particles 211 of the light diffusing unit 210 to avoid inference of surrounding noise light rays. As the refractive index of the liquid crystal layer 11 of the PDLC film 1 is equal to the polymers, incident light can pass therethrough completely, so that the light-regulation membrane is changed to a transparent status. Subject to diffusion by the light diffusing unit 210, light images are temporarily retained at the crystal molecules. Further, subject to the effects of the high-reflection black and transparent metal oxide, for example, titanium oxide of the conducting layer 12, the images exposed on the light-regulation membrane provide high transparency and suspension image projection effects, in consequence, the contrast ratio (picture brightness/darkness) is improved. This second operation mode of the light-regulation membrane is practical for commercial application, enabling spectators to watch the suspension of images in a three-dimensional space.

Further, as stated above, the light-regulation membrane can be detachably adhered to a flat surface of a transparent object 4 by means of the adhesion layer 3. This installation method is easy and simple without destructing the interior design of the building or house. Therefore, the light-regulation membrane has the advantages of re-usable, low cost, convenience in use and maintenance. Further, the light-regulation membrane can be kept smooth on a flat surface and will not be vibrated upon an air flow, assuring a high quality of image exposure.

Further, by means of switch on/off the external power source, the light-regulation membrane enables the transparent object 4 to let light pass or to reflect light. It can also effectively isolate and reflect heat, keeping the indoor space warm in the winter or cool in the summer and saving power consumption. The advantages of the light-regulation membrane of the present invention are not achievable by conventional window screens, window glasses or thermal insulation films.

Although particular embodiments of the invention have been described in detail for purposes of illustration, various modifications and enhancements may be made without departing from the spirit and scope of the invention.

What the invention claimed is:

1. A light-regulation membrane comprising: a polymer dispersed liquid crystal film, a surface structure formed on one side of said polymer dispersed liquid crystal film and an adhesion layer formed on an opposite side of said polymer dispersed liquid crystal film, wherein:
   said polymer dispersed liquid crystal film comprises two conducting layers electrically connected to an external power source and a liquid crystal layer sandwiched between said two conducting layers, said conducting layers are prepared by high-reflection black and transparent materials made by means of depositing titanium oxide on a base layer of polyethylene terephthalate by means of spattering deposition;
   said surface structure comprises a hard coating layer and an anti-stain layer, said hard coating layer being sandwiched between said polymer dispersed liquid crystal film and said anti-stain layer, said hard coating layer comprising a light diffusing unit formed of nano grade light diffusing particles of crosslinking copolymer acrylates and ultraviolet absorbent mixture;
   said adhesion layer is formed the opposite side of said polymer dispersed liquid crystal film opposite to said surface structure and releasably adhered to a transparent object;
   when said external power source is switched off, the liquid crystal layer of said polymer dispersed liquid crystal film is off, said light-regulation membrane is changed to a frosted reflective status for enabling the nano grade light diffusing particles of said light diffusing unit to diffuse incident light from an external image projection apparatus and the liquid crystal layer of said polymer dispersed liquid crystal film to reflect the diffused light toward the outside;
   when said external power source is switched on, said liquid crystal layer is changed to a transparent status, and incident light from an external image projection apparatus is primarily diffused by said nano grade light diffusing particles of said light diffusing unit and light images are temporarily retained at the crystal molecules and reflected by the high-reflection black and transparent materials of said conducting layers to provide a suspension image projection effect.

2. The light-regulation membrane as claimed in claim 1, wherein said liquid crystal layer of said polymer dispersed liquid crystal film is prepared from a compound of hydroxyl polyfunctional (meth) acrylates and nematic liquid crystal cured with a polyisocyanate compound crosslinking agent.

3. The light-regulation membrane as claimed in claim 1, wherein said polymer dispersed liquid crystal film further comprises at least one polymer compound layer coated on each said conducting layer.

4. The light-regulation membrane as claimed in claim 3, wherein said polymer compound layer is prepared from a plastic chemical material, for example, PET (polyethylene terephthalate), PMMA (polymethyl methacrylate), PC (polycarbonate), PP (polypropylene), PE (polyethylene), PVDC (polyvinylidene chloride), PS (polystyrene), COP (cycloolefin polymer), hydrogenated polystyrene or their compound.

5. The light-regulation membrane as claimed in claim 3, wherein said polymer dispersed liquid crystal film further comprises a pressure sensitive adhesive sandwiched between two polymer compound layers at each side thereof.

6. The light-regulation membrane as claimed in claim 1, wherein said crosslinking copolymer acrylates of said hard coating layer of said surface structure contain a predetermined ratio of urethane bond, having a specific repetitive structural unit.

7. The light-regulation membrane as claimed in claim 1, wherein said nano grade light diffusing particles of said light diffusing unit of said hard coating layer are inorganic particles, organic particles, or hybrid particles of inorganic and organic materials.

8. The light-regulation membrane as claimed in claim 1, wherein said hard coating layer contains 95~99.9% crosslinking copolymer acrylates and 0.1%~5% light diffusing particles; the refractive index of the body of said hard coating layer is different from that of said nano grade light diffusing particles.

9. The light-regulation membrane as claimed in claim 1, wherein said adhesion layer is made of a mixture of organic silicone and acrylic pressure sensitive adhesive.

* * * * *